United States Patent [19]

Yamaguchi

[11] 4,165,871

[45] Aug. 28, 1979

[54] PATTERN READING DEVICE

[75] Inventor: Ryoji Yamaguchi, Tokyo, Japan

[73] Assignee: Tokyo Shibaura Electric Co., Ltd., Kawasaki, Japan

[21] Appl. No.: 797,255

[22] Filed: May 16, 1977

[30] Foreign Application Priority Data

| May 14, 1976 | [JP] | Japan | 51-54854 |
| May 14, 1976 | [JP] | Japan | 51-54859 |
| May 14, 1976 | [JP] | Japan | 51-54862 |
| May 14, 1976 | [JP] | Japan | 51-60924[U] |
| May 14, 1976 | [JP] | Japan | 51-60939[U] |
| Dec. 15, 1976 | [JP] | Japan | 51-150448 |
| Jan. 31, 1977 | [JP] | Japan | 52-10155[U] |

[51] Int. Cl.² .......................................... G06K 19/06
[52] U.S. Cl. .................................... 271/127; 235/483
[58] Field of Search .................. 271/4, 118, 127, 277; 235/483

[56] References Cited

U.S. PATENT DOCUMENTS

| 3,062,538 | 11/1962 | Rutkus, Jr. et al. | 271/277 |
| 3,137,495 | 6/1964 | Eichorn | 271/6 |
| 3,533,617 | 10/1970 | Collins | 271/127 |
| 3,758,105 | 9/1973 | Okamoto | 271/127 |
| 3,883,133 | 5/1975 | Rebres | 271/127 |
| 3,935,429 | 1/1976 | Branecky et al. | 235/61.11 E |
| 3,983,366 | 9/1976 | Gunn | 235/61.11 E |
| 3,984,659 | 10/1976 | Billbrey | 235/61.11 E |
| 3,989,236 | 11/1976 | Komori et al. | 271/127 |

*Primary Examiner*—Vincent P. Canney
*Attorney, Agent, or Firm*—Cushman, Darby & Cushman

[57] ABSTRACT

A pattern reading device comprises feed mechanism for storing a sheaf of cards carrying patterns and feeding said cards one by one, a conveying mechanism having a plurality of pinch members at regular intervals to pinch the forward edge of each fed card and convey said card to a reading section, and an optical reader provided in said reading section for reading patterns on said cards.

15 Claims, 15 Drawing Figures

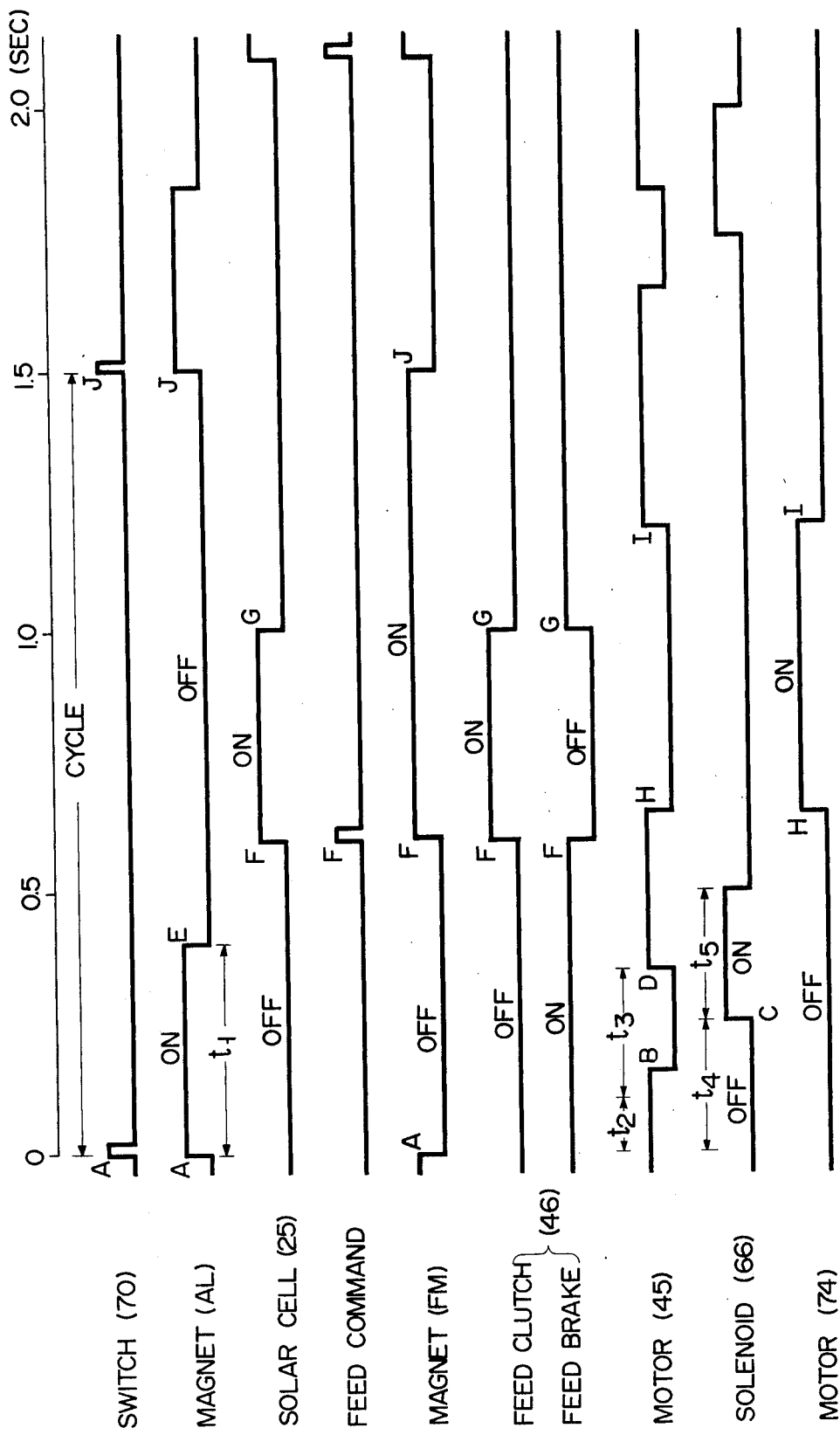

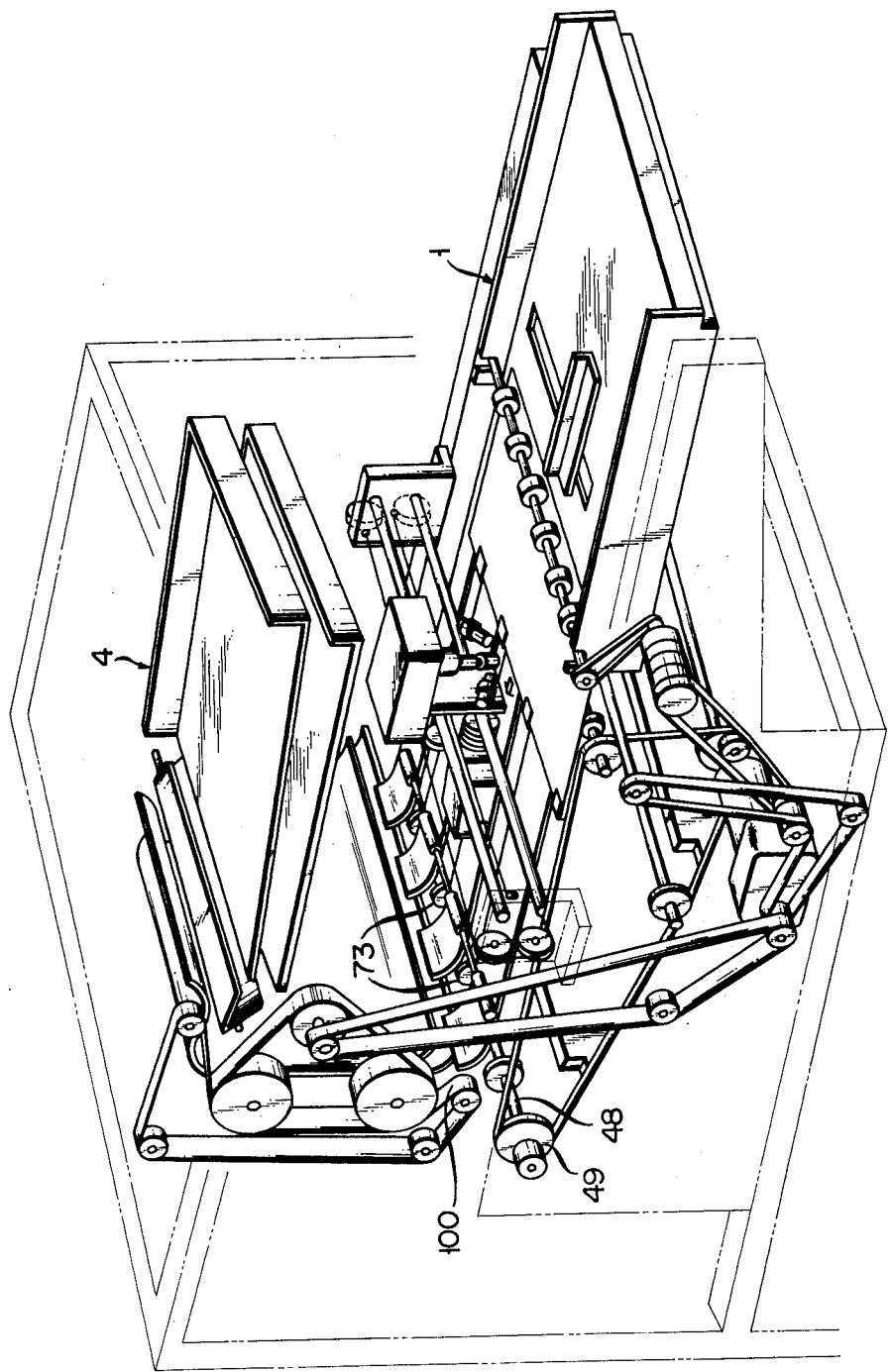

PATTERN READING DEVICE

BACKGROUND OF THE INVENTION

This invention relates to a pattern reading device to be used as an input unit for e.g. an electronic computer.

In an electronic computer which processes a wide variety of massive slips (hereinafter referred to as cards) efficiently and automatically, there is required an input unit which converts figures and/or letters in the cards into electric signals for input. For the input units, there are generally used card readers or tape readers which punch cards or paper tapes by means of keypunches and convert them into electric signals, and optical pattern reading devices which convert the figures and/or letters in the cards into electric signals by using light and perform interpretation by means of discrimination circuits.

The aforesaid card readers or tape readers are disadvantageous because they would require experts such as keypunches as well as prolonged input time, whereas the optical pattern reading devices are easy to operate and require only short process time, thereby enjoying a wide range of use.

Since such pattern reading device is so designed that an optical reader reciprocates to read patterns such as letters and figures entered in each line on the cards, such cards should be carried smoothly at precisely fixed pitches for confrontation with the reader without skewing the cards. Therefore, in the prior art, there has been used a means for conveying each fed card sucked by a vacuum rotary drum. However, such means may not prevent the above-mentioned skewing completely, and it is hard to secure conveyance of the cards at accurate pitches with such means. Further, thus increased size of the mechanism would not only require larger space but lead to louder noises at operation and higher cost.

SUMMARY OF THE INVENTION

Accordingly, an object of this invention is to provide a pattern reading device relatively simple in construction with improved performance in conveyance of cards, prevention of skewing, and equally pitched feed as well as with higher readability.

BRIEF DESCRIPTION OF THE DRAWINGS

FIG. 14 is a time chart illustrating the operation of the device designed definitely.

FIG. 15 is a perspective view of the pattern reading device according to another embodiment of this invention.

DETAILED DESCRIPTION OF THE PREFERRED EMBODIMENTS

Now I will describe the pattern reading device according to an embodiment of this invention with reference to the accompanying drawings.

Figure 1:
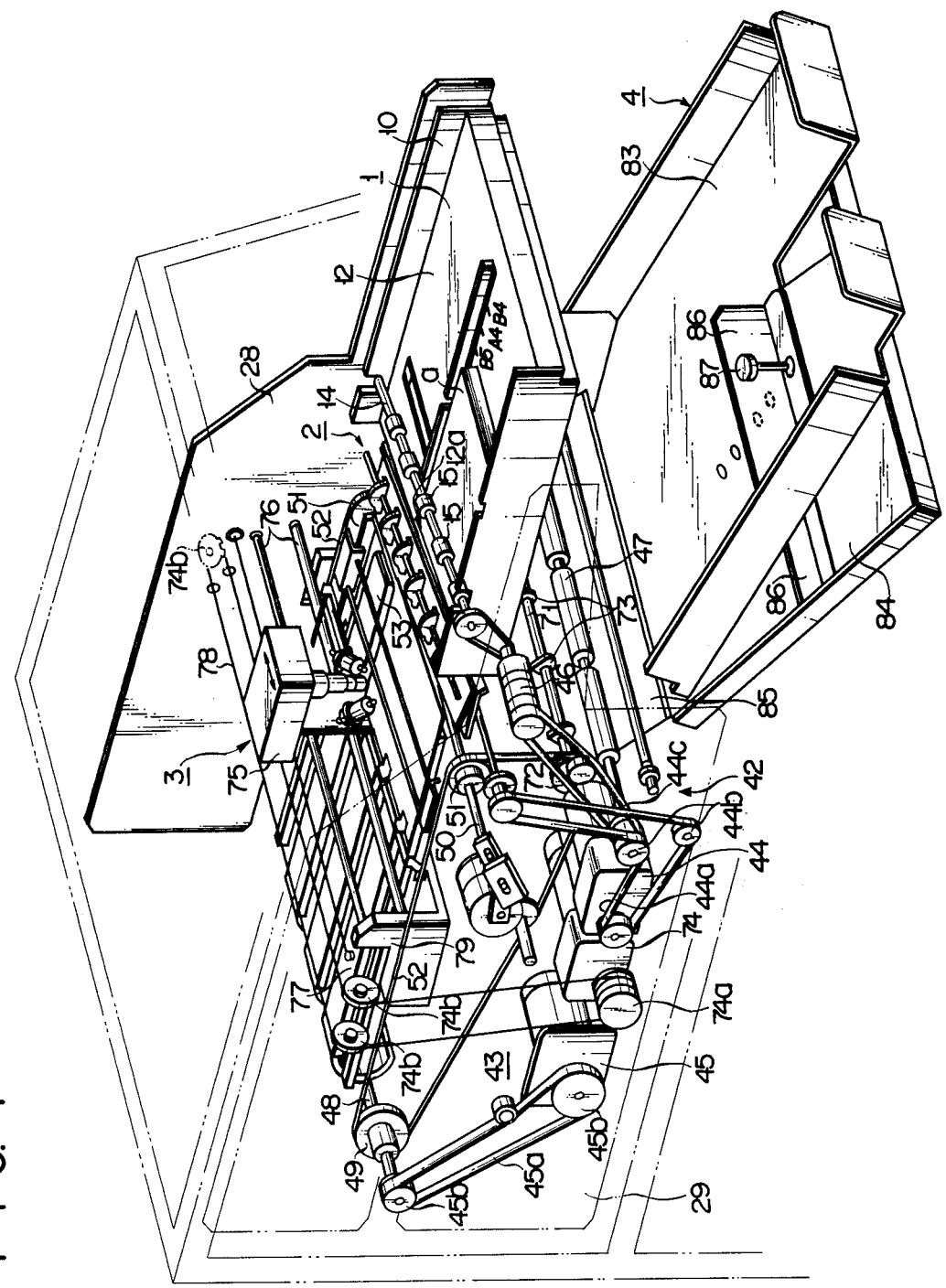
FIG. 1 is a perspective view of the pattern reading device according to an embodiment of this invention.

In the pattern reading device as shown in FIG. 1 cleared of the housing, cover and the like that are unnecessary for the description herein, there are provided a feed mechanism 1 for storing a number of cards carrying patterns to be read and feeding them one by one, a conveying mechanism 2 for conveying such cards, a reading mechanism 3 for reading patterns on these cards optically, and a discharge mechanism 4 for discharging the read cards out of the device.

Figure 2:
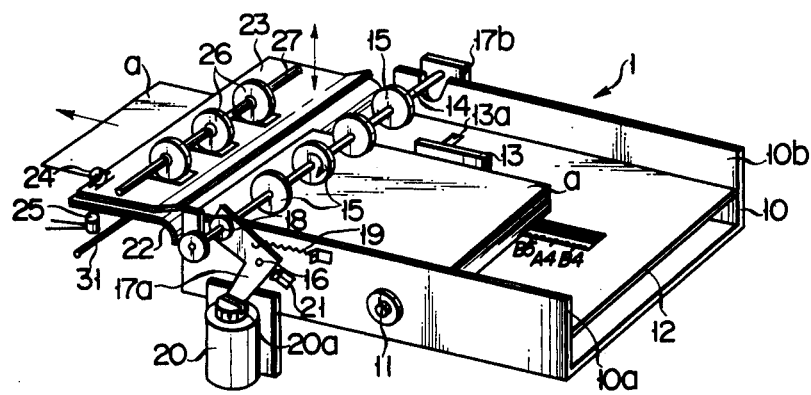
FIGS. 2 and 3 are perspective and cross-sectional views of the card feed mechanism of the device of FIG. 1, respectively.
Figure 3:
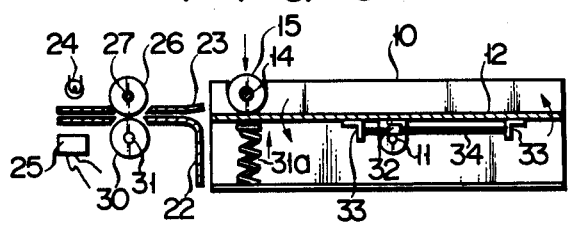

As shown in detail in FIGS. 2 and 3, the feed mechanism 1 has a feed base 12 vertically-rockably borne by support pins 11 protruding inward opposite to each other from frame portions 10a and 10b on both sides of a feed base support frame 10, respectively. On the feed base 12 is provided a movable guide plate 13 along a slit 13a to regulate the right edge of sheets a such as cards placed in layers on the top surface of the feed base 12. The guide plate 13 can be moved from side to side according to the width of the cards. Thus, the right and left edges of the cards a are retained by the guide plate 13 and the left frame portion 10a of the support frame 10, respectively, so as not to shift widthwise. Above the card takeout side end of the feed base 12 is located a driving shaft 14 extending in the direction perpendicular to the card takeout direction. On the driving shaft 14 are coaxially mounted a plurality of takeout rubber rollers 15 at regular intervals. Both end portions of the driving shaft 14 are fitted in and retained by vertical notches extending downward from the top face of the two frame portions 10a and 10b. Thus the driving shaft may be moved in the vertical direction. Both extended ends of the driving shaft 14 are rotatably borne by bearings 18 (one only shown) attached to the upper end portions of L-shaped arms 17a, 17b pivotally mounted on the outer sides of the frame portions 10a and 10b of the support frame 10 by means of spindles 16. The driving shaft 14 is rotated by a first motor as mentioned hereinafter. Each of arms 17a, 17b is coupled with one end of each tension spring 19 with the other end held by each support frame, and always energized in a fixed direction, i.e., such direction as to urge the takeout rollers 15 upward. To the lower end of each arms is coupled a plunger 20a of each plunger-type solenoid 20, which, when excited, rocks the arm against the energizing force of the spring 19, thereby lowering the driving shaft 14 to bring the takeout rollers 15 into contact with the uppermost card. The rocking motion of the arm is controlled by a stop 21 attached to the support frame 10 so that the fall of the takeout rollers 15 may always be kept constant. As a result, the takeout rollers 15 are brought into contact with the uppermost card a at a proper pressure, thus securing takeout of each card by rotation of the takeout rollers 15. There is provided an engaging pawl 12a protruding from the frame body at one feed-side edge of the feed base for engagedly truing up the edges of the cards in layers so that only the uppermost card, frictionally engaged with the takeout rollers, may get over such engaging pawl.

In the takeout direction of the cards a are located a pair of conveyance guide plates 22 and 23 facing each other with a narrow vertical space left therebetween for guiding the cards. At the forward left ends of these conveyance guide plates 22 and 23, that is, in the area on the datum edge side of the cards in the card takeout direction are bored apertures. Above and under such apertures are located a lamp 24 and a solar cell 25, respectively, for detecting the card to be guided between the conveyance guide plates 22 and 23. Further, in these conveyance guide plates are bored a plurality of roller slots arranged at regular intervals in the widthwise direction of the cards and extending in the transfer direction of the cards. Above one conveyance guide plate 23 widthwise extends a bearing shaft 27 on which a plurality of alignment rollers 26 are mounted coaxially at regular intervals in the axial direction. The bearing shaft 27 is vertically-movably supported by a pair of support plates 28 and 29 facing each other, and is moved up and down by an alignment magnet AM. When the shaft 27 is lowered, the lower portions of the alignment rollers extend through the roller slots in the guide plate 23 to come into contact with the card. Under the other guide plate 22 are arranged a plurality of driving rollers 30 (FIG. 3) mounted on a bearing shaft 31 at regular intervals, the upper portions of such rollers 30 extending through their respective roller slots. These rollers 30 are also rotated by the first motor as mentioned hereinafter to transfer the card forward.

Figure 4:
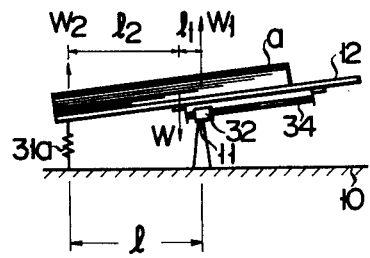
FIG. 4 is a schematic side view of the card feed mechanism for illustrating the operation thereof.

The card feed mechanism 1 is provided with means for keeping the contact pressure between the takeout rollers and the uppermost card independently of the number and size of the cards retained, which will be described with reference to FIGS. 3 and 4.

On the under surface of the feed base 12 right under the feed rollers are provided compression springs 31a to energize the feed base 12 clockwise round the pins 11 as in FIG. 3.

In order to prevent the pressure of the springs 31a upon the takeout rollers 15 from changing due to the variation of the weight of the cards to be placed on the feed base 12, each support pin 11 is so attached as to provide one-point support corresponding to the centroidal portion of the largest card to be placed on the feed base 12, thereby minimizing the load on the springs 31a. The clockwise rocking motion of the feed base 12 from the substantially level position is controlled by a suitable means, e.g., such aforesaid engaging pawl that extends from the frame body beyond the feed base so as to prevent two or more cards from being detached at a time. Meanwhile, the feed base 12 may be freely rocked counterclockwise, that is, in the direction in which the feed base 12 goes away from the rollers against the pressure of the springs 31a. According to the above-mentioned construction, most of the load from the sheaf of cards is imposed on the support pins 11, and only a small portion of the load is imposed on the support springs 31a, thereby controlling the pressure of the support springs 31a upon the takeout rollers 15 within a predetermined range. For example, there is retained a nearly 20 mm thick sheaf of A4 cards with the individual thickness of 0.155 mm. As shown in FIG. 4, if the weight of the sheaf of cards is W, the load on the support pin 11 is W1, the load on the support springs 31a is W2, the distance between the support pin 11 and the support springs 31a is l, the distance between the support pin 11 and the center of gravity of the sheaf of cards $l_1$, and the distance between the support springs 31a and the center of gravity of the sheaf of cards is $l_2$; there will be obtained the following equations.

$$W1 = W(l_2/l)$$

$$W2 = W(l_1/l)$$

According to such relationship, where l and W are given at 150 mm and about 1,040 g respectively, W2 may be about 195 g.

If the spring constant of the support spring 31a is selected properly, the value of W2 varies only within a range of ±50 g even though the cards are fed successively. Though use of smaller cards may bias the center of gravity of the sheaf nearer to the support spring 31a side, variation of the load on the spring 31a can be restrained within ±50 g because the dead weight of the sheaf of cards itself is lighter. Thus, the contact pressure between the takeout rollers 15 and the cards is substantially constant independently of the size and quantity of the cards, so that the frictional force between the cards and the takeout rollers may be kept substantially constant, thereby securing steady takeout of each card.

Figure 5:
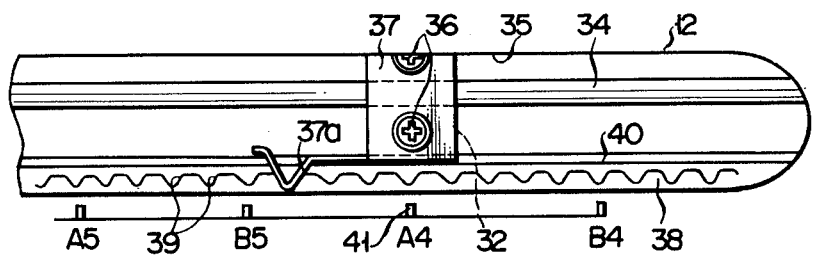
FIGS. 5 and 6 are plan and cross-sectional views of the positioning mechanism of the card feed mechanism, respectively.
Figure 6:
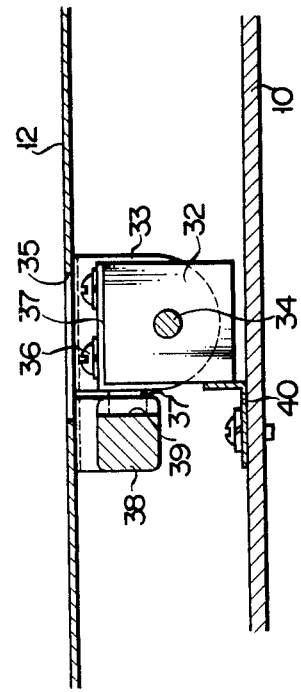

Under the feed base 12 is provided a weight 32 for compensating the variation of balance condition of the feed base 12 which may be caused by the change of size of the cards a. The weight 32 is slidably sustained by a guide shaft 34 fixed by means of a pair of brackets 33 so as to extend away from the feed side. As shown in FIGS. 5 and 6, a slit 35 is formed in the feed base 12 at a position facing the passage of the weight 32 so that the weight 32 may be moved from the top side of the feed base 12. A positioner 37 composed of a leaf is attached to the weight 32 by means of setscrews 36. A V-shaped engaging portion 37a of an elastic strip extending along the upper portion of one side wall of the weight 32 is elastically engaged with one of grooves 39 formed continuously on one side of a positioning guide shaft 38 attached to the under surface of one edge of the slit 35, thereby preventing natural shifting of the weight 32. The lower portion of one side of the weight 32 is in contact with the raised portion of a guide 40 with L-shpaed section attached to the bottom plate of the support frame 10, thereby preventing the weight 32 from rocking. On the top surface of one edge of the slit 35 is provided a scale 41 to facilitate positioning of the weight 32 in accordance with the size of the cards.

In FIG. 1, the conveying mechanism 2 of the pattern reading device is provided with a feed/discharge mechanism 42 and a ratchet feed mechanism 43. The feed/discharge mechanism 42 is driven by a first motor 44 attached to one 29 of a pair of mounting support plates 28 and 29 facing each other at a distance, while the ratchet feed mechanism 43 is driven by a second motor 45 composed of a stepping motor. These mechanisms and motors are operatively connected in the following manner. The rotation of the first motor 44 is transmitted to the feed rollers 15 through endless belts 44a and 44c, pulleys 44b, and a clutch brake 46. Such rotation of the first motor 44 is also transmitted to the bearing shaft 31 bearing the conveying rollers as shown in FIG. 3 through the endless belt 44a and the pulley 44b, thereby rotating the rollers 30. Further, the rotation of the first motor 44 is transmitted to discharge rollers 47 facing the discharge mechanism 4 and borne between the support plates 28 and 29 through the endless belt 44a and the pulley 44b. Thus the feed/discharge mechanism 42 is composed of the feed rollers 15, conveyance rollers 30, discharge rollers 47, and the first motor 44 for driving these rollers.

Now I will describe the ratchet feed mechanism 43.

Figure 8:
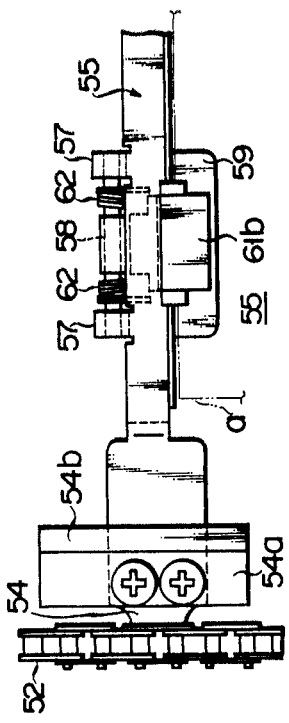
FIGS. 8 to 10 are plan, perspective, and cross-sectional views of a part of the ratchet feed mechanism of the device, respectively.
Figure 7:
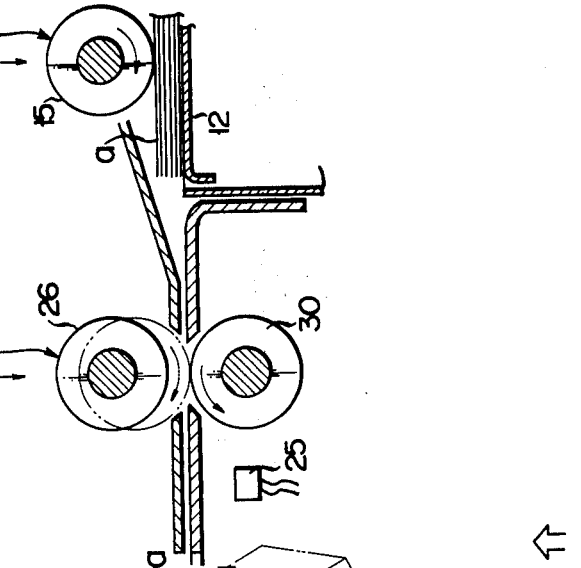
FIG. 7 is a cross-sectional view of the conveying mechanism of the device as shown in FIG. 1.
Figure 7:
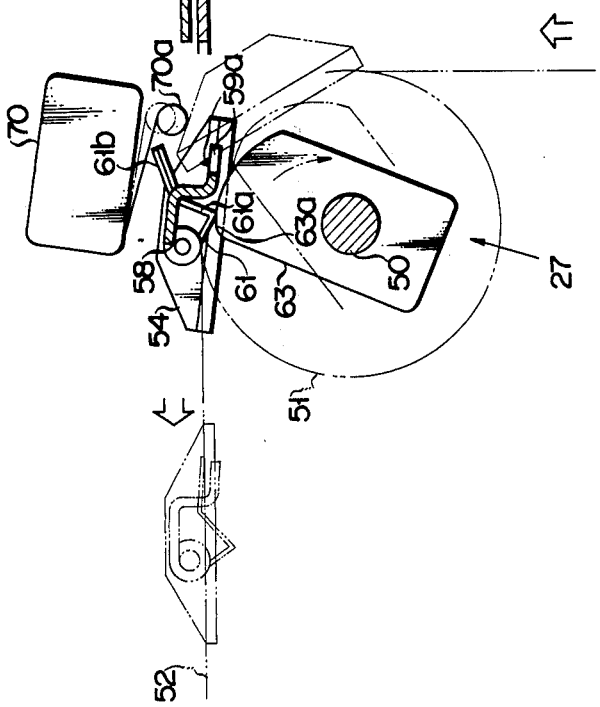
Figure 9:
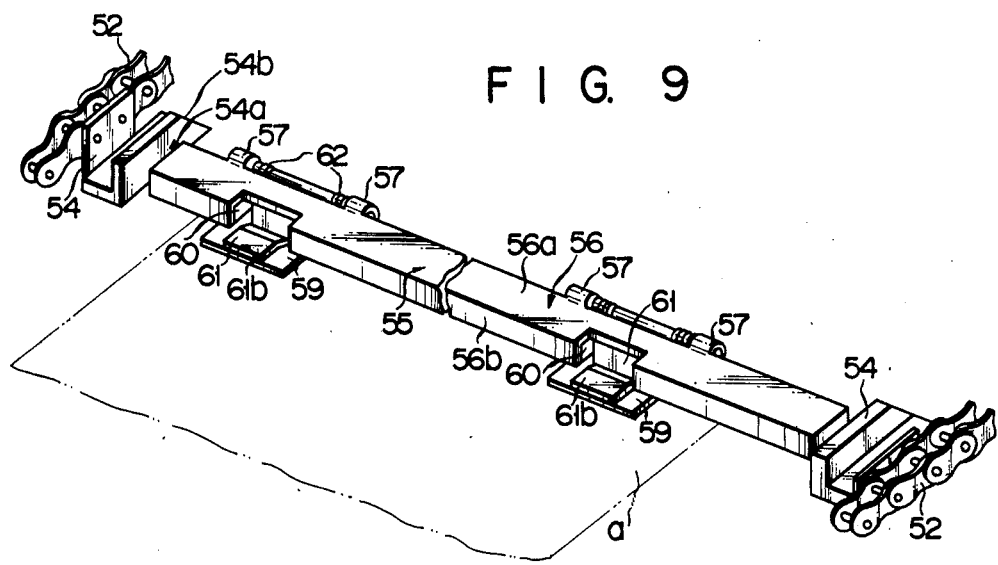
Figure 10:
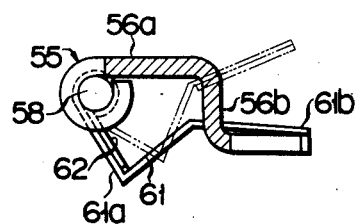

The rotary shaft of the second motor 45 is connected to a coupling shaft 48 rotatably supported by and between the back portions of the mounting plates 28 and 29 through a belt 45a and pulleys 45b. In the vicinity of both ends of the coupling shaft 48 are coaxially fixed a pair of driving sprockets 49. Further, a pair of driven sprockets 51 are coaxially rotatably mounted on a coupling shaft 50 rotatably supported by and between the back portions of the mounting plates 28 and 29. Between each pair of the driving sprocket 49 and the driven sprocket 51 is stretched an endless chain belt 52. Both chain belts 52 are located on both side of a retaining plate 53 to carry the cards a delivered from between the conveyance guide plates 22 and 23 on top thereof for reading operation. Further, both such chains 52 face each other and have the upper portions extending horizontally in parallel with the retaining plate 53. On these chains 52 are mounted a plurality of attachments 54 (six for each chain in this embodiment) as shown in FIGS. 7 and 8 at regular intervals. Each attachment 54 on one chain correspond to each attachment 54 on the other chain, and such corresponding pair of attachments 54 are fitted with both ends of a pinch member 55 through accessaries 54a as shown in FIGS. 8 to 10, respectively. Therefore, in this embodiment of the invention, such pinch members 55 used are also six in number, arranged at equal pitches in such a manner as to move accompanying the movement of the chains 52. Each of these pinch members 55 has a thin elongated metal plate 56 extending horizontally in the direction perpendicular to the moving direction of the chains 52. The plate 56 has a horizontal strip 56a with both ends supported by the attachments 54a and a vertical strip 56b bent integrally at the backward edge of the horizontal strip 56a and extending vertically downward therefrom. At the forward edge of the horizontal strip 56a protrude a plurality of pairs of bearings 57 at regular intervals along the longitudinal direction. Both ends of a pivot 58 are rockably supported by each pair of bearings 57. A horizontal tongue 59 protrudes backward, that is, in the opposite direction to the bearing 57 on the bottom edge of the vertical strip 56b at a position corresponding to each pivot 58. On the plate 56 at a position corresponding to each pivot 58 is formed an opening 60 extending from the backward edge of the horizontal strip 56a to the forward edge of the tongue 59 through the vertical strip 56b. The forward edge of a presser 61 is vertically-rockably borne by the pivot 58, to which the coiled portion of a torsion spring 62 is attached. The presser 61, as shown in FIG. 10, has a main body 61a with V-shaped section located below the horizontal strip 56a and a movable pinch portion or pawl 61b extending along the tongue 59 from the backward edge of the main body 61a through the opening 60. The upper surface of the tongue 59 has projections 59a and the under surface of pinch portion 61b is provided with a frictional surface such as a rubber face. The free end of the tortion spring 62 is brought into contact with the forward inclined portion of the main body 61a, while the pinch portion 61b of the presser 61 is elastically pressed against the top surface of the tongue 59 to secuarly hold the edge of the card between the projections 59a and rubber surface.

Figure 11:
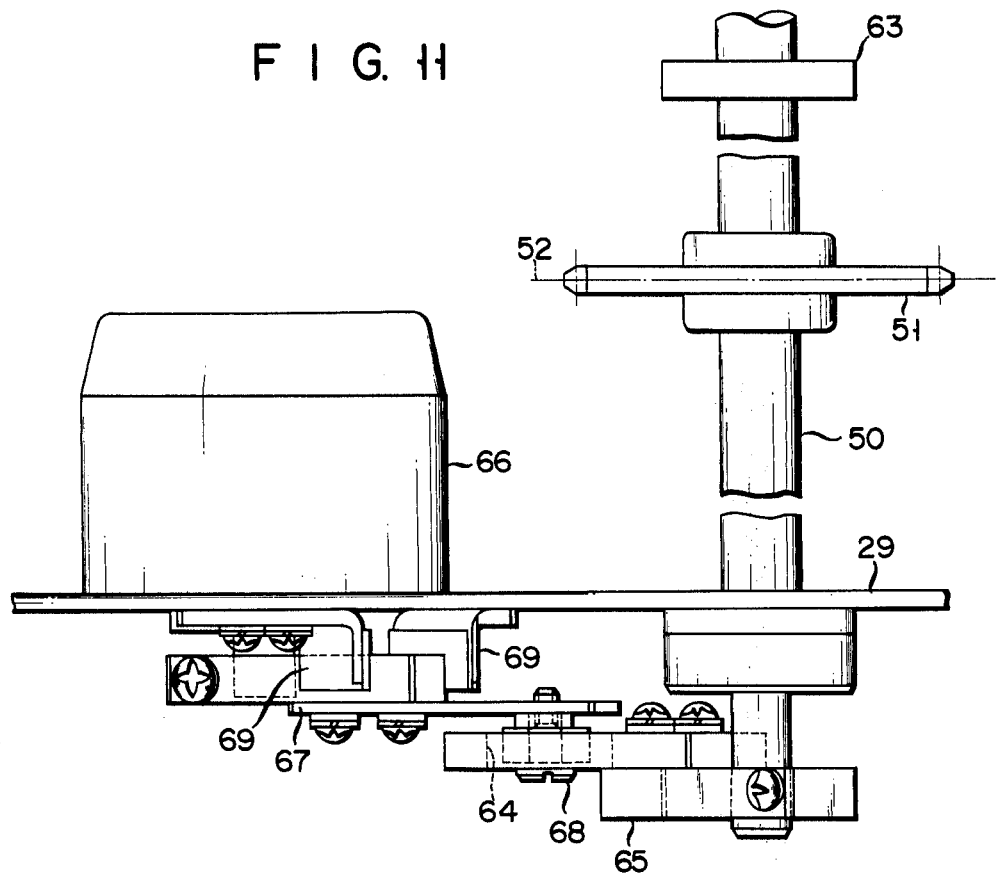
FIGS. 11 and 12 are plan and side views of the rotating mechanism for driving the ratchet feed mechanism, respectively.
Figure 12:
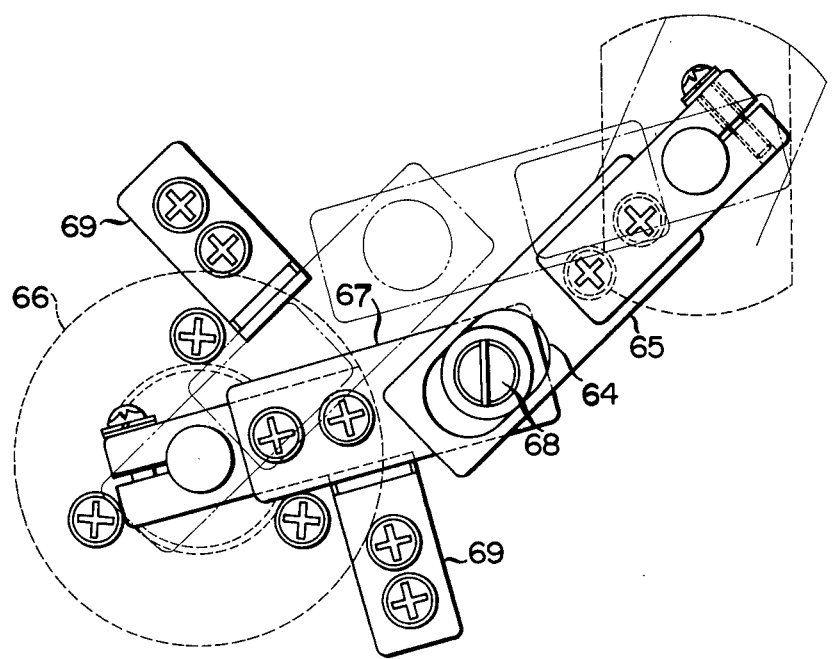

On the coupling shaft 50 provided in the vicinity of the delivery side of the conveyance rollers 30 are fixed a plurality of pawl opening cams 63 at regular intervals along the coupling shaft 50, each corresponding to the respective presser 61. Each pawl opening cam 63 has a cam surface 63a which is engaged with a central portion 61a of the presser 61 accompanying the rocking of the cam 63 as shown in FIG. 7 to rock the presser 61 counterclockwise round the pivot 58, thereby separating the pawl 61b from the tongue 59 against the force of the torsion spring. One end of the coupling shaft 50 carrying the cam 63, protrudes outward from the support plate 29, and on such protrusion is mounted a driven lever 65 with a slot 64 bored in one end portion thereof as shown in FIGS. 11 and 12. On the support plate 29 is fixed a rotary solenoid 66 whose rotary shaft is connected with such an operating lever 67 that may rock together with the rotary shaft. At one end of the lever 67 protrudes a pin 68 inserted loosely in the slot 64 of the driven lever so as to be able to move along the slot 64. A pair of stops 69 protrude on the support plate 29 with the operating lever 67 put therebetween at regular intervals, thereby defining the rocking range of the operating lever 67. Thus, when the rotary solenoid 66 is energized, the pawl opening cam 63 is to be rocked through a fixed angle through the operating lever 67, driven lever 65, and coupling shaft 50. Operation of the rotary solenoid 66 is controlled by a microswitch 70 as shown in FIG. 7 that has an operator 70a to come into contact with the accessary 54a accompanying the movement thereof for making operation in the vicinity of the delivery side of the conveyance rollers 30. Also below the coupling shaft 51, that is, on the discharge side is rotatably borne a coupling shaft 71 similar to the coupling shaft 51 by and between the supporting plates 28 and 29. In the vicinity of both ends of the coupling shaft 71 are coaxially rotatably mounted driven sprockets 72 of the chains 52, respectively. Further, on the same coupling shaft 71 are mounted pawl opening cams 73 to perform in the same way as the pawl opening cams 63, releasing the pinch member 55 when it comes above each of the cams 73.

The aforementioned reading mechanism 3 is provided with a third motor 74 composed of a servomotor mounted on one supporting plate 29, a conventional optical reader 75, and reciprocating drive mechanism 77 for transmitting the driving force of the third motor 74 to the optical reader 75 and reciprocating the reader 75 along the guide rails 76. The reciprocating drive mechanism 77 includes a pulley 74a fixed on the rotary shaft of the third motor 74 and a wire 78 stretched round the pulley 74a and an idle pulley 74b and wound round another pulley (not shown) provided on the optical reader 75. The guide rails 76 extend horizontally above the support plate 53 in the direction perpendicular to the direction in which the cards a are conveyed, and have both ends fixed to support fittings 79 with raised strips mounted near both sides of the chains 52, respectively. The rotation of the third motor 74 may be switched by bringing the reader 75 into contact with a microswitch (not shown) provided at both strip portions of the guide shaft fitting 79. On this side of the reader 75 is provided a third detector (not shown) for detecting passage of the pinch member.

Figure 13:
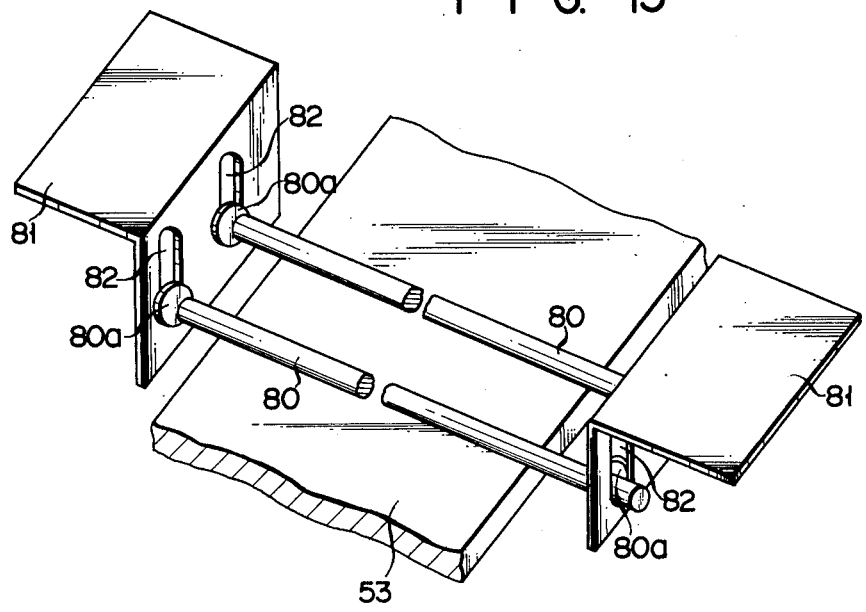
FIG. 13 is a perspective view of a pair of card presser bars used with the reading mechanism of the device.

Under the optical reader 75 extend a pair of presser rollers 80, as illustrated in detail in FIG. 13, in parallel with each other at a fixed space so that the reader 75 may scan a portion of the card between these rollers 80 pressed against the top surface of the support plate 53 by such rollers 80. These presser rollers 80 have both ends inserted loosely in vertical slots 82 of L-shaped plates 81. When the pinch member 55 comes close to the rollers 80, the trapezoidal cam surface 54b (FIG. 9) of the accessory 54a forces up the rollers 80 along the slots 82. Consequently, the rollers 80 are lifted above the support plate 53 when the pinch member 55 passes therethrough, thus eliminating hindrance to the moving member 55. Flanges 80a provided in the vicinity of both ends of the rollers 80 are to control the axial movement of these rollers 80. In the device as shown in FIG. 1, the discharge mechanism 4 is located right under the feed mechanism 1, and provided with first and second stackers 83 and 84 attached to each other at different tilt angles, a gate plate 85 extending between the inlet side edges of these stackers 83 and 84 and the discharge rollers 47, and a spring (not shown) for tearing off the cards in elastic contact with the discharge rollers 47.

The first and second stackers 83 and 84 are provided with stop 86 for regularing the forward edges of the cards a discharged, respectively. The stop 86 is composed of raised plates extending at a right angle to the discharge direction. The positions of the stop 86 are fixed by a setscrew 87 screwed into the bottom walls of the stop 86. The screw holes for the setscrew in the bottom wall of each stacker are formed in a line at regular intervals in the discharge direction. The position of the stop 86 may be controlled by screwing the setscrew 87 into any prescribed hole, thereby adjusting the length of the practical receiving area of each stacker regulated by the stop according to the length of the cards.

Now I will describe an outline of the pattern reading device with the above-mentioned construction.

First, read members or a sheaf of cards a are placed on the feed base 12. Then a first detector (not shown) detects these cards and produces a starting signal for takeout, thereby exciting the feed roller magnet FM and actuating the clutch of the clutch-brake 46. As a result, the feed rollers 15 are lowered and brought into rotative contact with the uppermost card a to deliver it forward. When the forward edge of the delivered card a is detected by a second detector or the solar cell 25, the magnet FM is deenergized and the brake of the clutch-brake 46 is operated. Thus, the feed rollers 15 break away from the top surface of the card a to stop the delivering operation. At that time, the delivery rollers 30 are in rotative contact with the forward edge of the card a, though the alignment rollers 26 are held above and not in contact with the same. After a prescribed period of time, the alignment roller magnet AM is excited by a signal from the second detector with a delay time, thereby lowering the rollers 26 to allow them to come into rotative contact with the card a by their own weight. Since the delivery rollers 30 are always being rotated by the first motor 44, the card a is pinched between the rollers 25 and 26 in conveyance. At such time, as shown in FIG. 7, each pinch member 55 is open; each presser 61 is engaged with the cam surface 63a of the pawl opening cam 63. In this position, as already described above, the cam surface 63a is thrusting the pawl 61b so as to break it away from the tongue 59 against the elastic force of the torsion spring 62. The forward edge of the card a is transferred to between the pawls 61b and the tongues 59. When such forward edge comes into contact with the vertical strip 56b of the pinch member 55, the transfer resistance increases according to the degree of such contact, stopping the rotation of the alignment rollers 26 spontaneously. Therefore, if the card a is skewed in delivery, such skewing may be corrected because the alignment rollers 26 disposed in positions corresponding to any uncontacted portions would go on rotating until the forward edge of the card is brought into substantially overall contact with the vertical strip 56b. After a prescribed period of time, the rotary solenoid 66 is excited to rock the pawl opening cam 63 through the rocking mechanism and the second motor 45 is driven. Consequently, the pinch members 55 are closed, and the chains 52 move to convey the pinched card a forward. After a predetermined period, the rotary solenoid 66 and alignment magnet AM are deenergized, the pawl opening cam 63 is returned in its original position and the alignment rollers 26 are raised. When the second detector 25 detects the backward edge of the card a, the feed roller magnet FM is excited. Accordingly, the feed rollers 15 fall again for feed of the next card in the same manner. Meanwhile, when the pinch member 55 pinching the card a reaches a predetermined position, the third detector detects this and stops the drive of the second motor 45 so that the card may stop at the position where it faces the optical reader 75, that is, the reading position. At the same time, there is produced a signal for start of reading, and the third motor 74 rotates, e.g., forward to reciprocate the optical reader 75 for reading the first line fixed by and between the presser bars 80. The third motor 74 is furnished with a timing desk, and the position of the reader 75 is detected by the combination of the solar cell and the lamp, so that the rotating direction of the third motor 74 may be changed according to the size of the card a without operating one of the microswitches attached to the guide shaft support fitting 79. Immediately before the optical reader 75, having finished reading the first line, changes its moving direction, the second motor 45 is driven in accordance with the set pulse to position the next line to be read between the pressor bars 80 and then stopped. If the reading is rejected, the same line is scanned again without shifting the card a, which is to be shifted after completion of such scanning. In this manner, the lines on the card are read successively. When all these lines are read out, the second motor 45 comes to rotate at a constant speed, while the microswitch 70 is brought into contact with the subsequent accessory 54a to stop the motor 45 again at another preset position for repetition of the aforementioned cycle. The card a with its all lines read out turns to a different direction at the position of the driving sprocket 48, and is guided to the supporting base plate with the inside turned out, that is, with patterned surface downward. Further, the presser 61 is brought into contact with the downward pawl opening cam 73 to open the pawl 61b of the pinch member, thereby releasing the card a from the pinch member. The card a is pressed against the continually rotating discharge rollers 47 by the tearing-off spring, and discharged optionally to the first stacker 83 or second stacker 84 depending on the position of the gate 85.

Referring now to FIG. 14, there will be described the operation of the reading device according to the above-mentioned embodiment on the basis of a definite design.

In the device according to this embodiment, the pinch members 55, six in number, are arranged at intervals of 190.5 mm. The card to be read is 105 mm long (A6 card) and carries a single line (550 msec required for reading one line). The processing speed is 40 sheets/min.

In FIG. 14, there is illustrated one cycle including takeout of the card, pinching of the card by the pinch member, and reading, though the selection by the gate after reading is not entered. The axis of abscissa represents the time starting from the point of time when the pinch member is detected by the microswitch with the taken-out card stopped temporarily after detection thereof by the detector 25. It is to be understood that the cycle time may vary with the card length, number of lines read, and number of pinch members.

Also in FIG. 14, A indicates a position in which the taken-out card is detected by the detector 25 and stopped for a while. In such temporary stop position, the feed magnet FM is turned "ON", the rollers are in contact with the card, and the brake is operated to suspend the card. The pinch member is transferred by the chains independently of the card, and when the detector 25 is at "OFF" position, that is, the card is suspended with the microswitch turned "ON", the sequence is initiated. When the microswitch is turned on, the alignment magnet AM is actuated to lower the alignment rollers 26 and interpose the card between such rollers 26 and the continually rotating driving rollers 30 to start feed. Then, the following operation is performed in order to release the aforesaid temporary stop function. That is, the feed magnet FM is turned "OFF" to raise the feed rollers.

Meanwhile, B indicates a position in which the pinch member is stopped temporarily in the open state after 0.15 sec from the point of time when the microswitch is turned on.

C indicates a position in which the card fed by the alignment rollers 26 has reached the opening of the pinch member within 0.25 sec and is pinched by such pinch member through the operation of the cam magnet.

D indicates a position in which the pulse motor (second motor 45) starts again after 0.1 sec from the actuation of the cam magnet.

E indicates a position in which the alignment magnet AM is turned "OFF" to raise the rollers 26 after the pulse motor started again and the alignment rollers performed feed operation for 0.05 sec.

F indicates a position in which the backward edge of the card passes through the detector 25 to turn on such detector 25. Thereafter, the feed command is given to turn "ON" the feed magnet FM and bring the feed rollers into contact with the card. Then, the feed clutch is actuated, the feed rollers are rotated, and the brake is released.

G indicates a position in which the rotation of the feed rollers is stopped, the clutch is turned off, and the brake is turned on when the forward edge of the taken-out card has been detected by the detector 25.

H indicates a position in which the card started from the position indicated by D is stopped where the line on the card to be read is located right under the reader 75, when the driving motor for the reader 75 is operated for start of reading.

I indicates a position in which the pulse motor is started again by the termination signal after completion of reading. Thereafter, the card is to be discharged into the stacker.

J indicates the same position as A, and thus the same operation is repeated.

In FIG. 14, t1 to t5 are preset points of time independent of the operating timing.

It is to be understood that the reading device to operate in accordance with the aforesaid time chart has been described herein only by way of example, and that various changes and modifications may be effected therein by setting suitable conditions.

Although there has been described the pattern reading device with the discharge mechanism 4 located below the feed mechanism to feed the card, the discharge mechanism 4 may be also located above the feed mechanism as shown in FIG. 15. In this case, the pawl opening cams 73 are mounted on the coupling shaft 48 bearing the driving pulleys 49, where the pinch member is opened and the card is released therefrom. The released card is transferred to the discharge mechanism 4 by a conveyor belt 100.

What is claimed is:

1. In a pattern reading device comprising a feed mechanism for storing a sheaf of cards carrying patterns and feeding said cards one by one, a conveying mechanism for conveying said card to a reading section, an optical reader provided in said reading section for reading patterns on said cards, and means for discharging each read card the improvement wherein said conveying mechanism comprises:
   at least one pinch member, the pinch member including an elongated body and a plurality of pinch portions arranged at intervals in the longitudinal direction of said body;
   means for abutting the entire forward edge of each card against the side of said elongated body; and
   driving means for operating the pinch member to pinch simultaneously the forward edge portions of each card when the entire forward edge of each card is abutted against the side of said elongated body and for moving the pinch member to bring the pinched card to said reading section, said forward edge portions of each card being set apart.

2. In a pattern reading device according to claim 1 the improvement wherein said conveying mechanism further comprises transfer means for retaining a plurality of pinch members at regular intervals and intermittently transferring said members, a first pinch member driving mechanism for inducing said pinch member to pinch each said card fed from said feed mechanism, and a second pinch member driving mechanism for releasing said card with the patterns read from said pinch member.

3. In a pattern reading device according to claim 2 the improvement wherein said transfer means comprises a pair of endless chains arranged at a fixed space and a pulse motor for intermittently driving said chains, wherein said pinch member comprises an elongated body with both ends connected to said chains respectively and a plurality of pinch portions arranged at regular intervals in the longitudinal direction of said body, and wherein said first and second pinch member driving mechanisms comprises first and second cams provided correspondingly to said pinch portions, respectively.

4. In a pattern reading device according to claim 1 the improvement wherein said feed mechanism comprises a feed base to carry said sheaf of cards, a support frame for bearing said feed base, and feed rollers vertically-movably mounted above said feed base and frictionally engaged with the uppermost card among said sheaf of cards to feed said card.

5. In a pattern reading device according to claim 4 the improvement wherein said feed mechanism further comprises support pins protruding from said support frame for pivotally supporting the middle portion of said feed base to allow said feed base to rock vertically, a bearing shaft provided on the feed side of said support frame and carrying a plurality of feed rollers, and spring means with one end pressed against the under surface of said feed base under said bearing shaft for rockably urging said feed base in the direction toward said feed rollers.

6. In a pattern reading device according to claim 1 the improvement wherein said conveying mechanism further comprises transfer rollers located between said feed mechanism and said reading section and brought in contact with the under surface of the card, and a plurality of alignment rollers vertically-movably mounted above said transfer rollers and brought into contact with the top surface of the card when lowered for delivering said card to said reading section in cooperation with said transfer rollers; said alignment rollers being arranged coaxially at regular intervals.

7. In a pattern reading device according to claim 1 the improvement further comprising a pair of retaining bars provided at said reading section for fixing the card; said retaining bars extending at regular intervals in the widthwise direction of the cards, and a portion of said card located between said retaining bars being scanned by said optical reader.

8. In a pattern reading device according to claim 7 the improvement further comprising supports for supporting the retaining bars to be vertically movable and accessories for upwardly moving the retaining bars to allow the pinch member to pass under the retaining bars.

9. In a pattern reading device according to claim 1 the improvement wherein said discharge means comprises a hopper and pinch rollers for discharge located in front of said hopper.

10. In a pattern reading device according to claim 9 the improvement wherein said discharge means further comprises a stop disposed within said hopper and capable of shifting so as to adjust the length of the effective receiving area according to the length of the card.

11. In a pattern reading device according to claim 1 the improvement wherein said feed mechanism is disposed above said discharge means.

12. In a pattern reading device according to claim 1 the improvement wherein said feed mechanism is disposed below said discharge means.

13. In a pattern reading device comprising a feed mechanism for storing a sheaf of cards carrying patterns and feeding said cards one by one, a conveying mechanism for conveying said card to a reader section, an optical reader provided in said reading section for reading patterns on said cards, and means for discharging each read card the improvement wherein said conveying mechanism comprises:
    at least one pinch member, said pinch member including an elongated body and a plurality of pinch portions arranged at regular intervals in the longitudinal direction of said body;
    transfer means for retaining a plurality of pinched members at regular intervals and intermittently transferring said members, said transfer means including a pair of endless chains arranged at a fixed space and a pulse motor for intermittently driving said chains, said elongated body having ends connected to said chains, respectively;
    a first pinch member driving means for inducing said pinch member to pinch each card fed from said feed mechanism;
    a second pinch member driving means for releasing said card with the patterns read from said pinch member; and
    said first and second pinch member driving means each including first and second cams provided correspondingly to said pinch portions, respectively, for operating the pinch member to pinch simultaneously the forward edge portions of each card, said forward edge portions of each card being set apart.

14. In a pattern reading device according to claim 10 the improvement wherein each said pinch portion comprises a tongue extending from the front of said elongated body in the direction toward said feed mechanism, presser means rockably attached to said elongated body and having a pawl extending over said tongue, and a spring for urging said presser means so that said presser means pinchs the card between said pawl and tongue thereof, and wherein said first and second cams comprise cam surfaces which contact the presser means to rock said presser means against the urging force of said spring.

15. In a pattern reading device according to claim 14, the improvement wherein said tongue and pawl have frictional surfaces for holding the edge of the card therebetween, the frictional surface including a rubber surface and a surface with at least one projection.

* * * * *